United States Patent [19]

Denoel et al.

[11] Patent Number: 4,986,863
[45] Date of Patent: Jan. 22, 1991

[54] PROCESS FOR PRODUCING A LAMINATED TUBULAR FIBROUS STRUCTURE FOR USE AS REINFORCING STRUCTURE FOR A COMPOSITE PIECE

[75] Inventors: Jean D. Denoel, Talence; Michel C. Vives, Eysines; Christian Bertone, Castelnau de Medoc, all of France

[73] Assignee: Societe Europeenne De Propulsion, France

[21] Appl. No.: 253,223

[22] Filed: Sep. 28, 1988

Related U.S. Application Data

[60] Continuation-in-part of Ser. No. 224,742, Jul. 27, 1988, Pat. No. 4,891,083, which is a division of Ser. No. 35,659, Mar. 26, 1987, Pat. No. 4,780,346.

[30] Foreign Application Priority Data

Sep. 28, 1987 [FR] France .............................. 87 13387

[51] Int. Cl.$^5$ .............................................. B65H 81/00
[52] U.S. Cl. ...................................... 156/194; 156/204; 156/474; 156/195
[58] Field of Search ............... 156/194, 195, 204, 474

[56] References Cited

U.S. PATENT DOCUMENTS

| | | | |
|---|---|---|---|
| 1,009,365 | 11/1911 | Wirt | 156/204 X |
| 1,932,809 | 10/1933 | Wheeler | 156/474 X |
| 2,688,906 | 9/1954 | Dokopil | 156/474 |
| 2,743,759 | 5/1956 | Snow et al. | 156/194 X |
| 2,950,152 | 8/1960 | Garceau | 156/194 X |
| 2,991,509 | 7/1961 | Brophy | 156/204 X |
| 3,023,787 | 3/1962 | Phillips et al. | 156/194 X |
| 4,708,756 | 11/1987 | Busen et al. | 156/195 X |

Primary Examiner—Michael L. Lewis
Attorney, Agent, or Firm—Lowe, Price, LeBlanc, Becker & Shur

[57] ABSTRACT

A laminated tubular fibrous structure is produced using a tubular braid and folding over its wall in order to form corrugations or wrinkles superposed in axial direction. The tubular braid is brought over a mandrel of which the inner diameter corresponds to that of the structure to be produced, by causing the braid to pass around a forming head which is mounted on the mandrel and of which the outer diameter corresponds to that of the structure to be produced, and at least one yarn is wound following a helicoidal path on the braid, around the mandrel and at the front of the forming head, between said head and a counter-piece of which the faces in facing relationship have shapes corresponding to the shape of the wrinkles to be produced, the winding of the yarn being performed while the forming head is moving away from the counter-piece progressively with the formation of the wrinkles. The structure is particularly suitable for use as reinforcing structure for producing pieces in composite material, such as ablative thermal protections for solid propellant rocket motors.

10 Claims, 2 Drawing Sheets

PROCESS FOR PRODUCING A LAMINATED TUBULAR FIBROUS STRUCTURE FOR USE AS REINFORCING STRUCTURE FOR A COMPOSITE PIECE

RELATED APPLICATIONS

This application is a continuation-in-part of U.S. patent application Ser. No. 224,742, now U.S. Pat. No. 4,891,083, filed on July 27, 1988, which is a divisional application issued from U.S. patent application Ser. No. 035,659 filed on March 26, 1987, now U.S. Pat. No. 4,780,346.

BACKGROUND OF THE INVENTION

The present invention relates to the production of a tubular laminated structure formed by layers of fibrous material, superposed in axial direction, each layer extending from the inside surface to the outside surface of the structure.

Such structures are particularly suitable for use as reinforcing structures constituting preforms for producing pieces in composite material, such as for example ablative thermal protections for solid propellant rocket motors. The composite pieces are obtained by densification of the preforms, this being achieved by core-deposition of a matrix-forming material, such as thermosetting resin, carbon or another refractory material, for example a ceramics-type material. Densification is performed in conventionally known manner by chemical vapor infiltration or by liquid impregnation followed by a heat treatment, or else by infiltration preceded by pre-impregnation.

OBJECTS AND SUMMARY OF THE INVENTION

Various processes are already known for producing reinforcing preforms for axi-symmetrical pieces in composite material.

One of these processes consists in staking rings of fibrous material and optionally bonding them together, for example by needling, in order to produce a preform which is thereafter densified to obtain the desired axi-symmetrical piece. This process is suitable for producing pieces of relatively small thickness, such as brake discs, but it is no longer adapted when the pieces to be produced have a greater axial dimension.

Another process consists in winding on mandrel yarns, tapes or strips of fibrous material in superposed layers. The layers may be bonded together in different ways, such as by needling or sewing or else by means of pins implanted on the surface of the mandrel, either to actually constitute radial bonding elements, or to provide a passage for radial reinforcing elements which are inserted after the winding operation.

An object of the invention is to provide a process and a device for producing laminated tubular fibrous structures for use as reinforcing structures for the production of pieces of any axial dimension but with an increased resistance to ablation, particularly when the pieces are subjected to high temperature gas flows.

Another object of the present invention to provide a process and a device permitting the automation of the production of such structures with a view to reducing production costs and obtaining structures with perfectly reproducible properties.

According to the invention, the process for producing a tubular laminated structure comprises the steps of providing a tubular braid made of a fibrous material, and folding over the wall of the tubular braid to form corrugations or wrinkles which constitute layers of fibrous material superposed in axial direction.

It is possible, by using such a tubular braid, to obtain a structure of any required axial dimensions. It is moreover possible, due to the deformability of the braid to obtain a structure in which the superposed layers, formed by the corrugations of the braid, can be given any required orientation with respect to the axis of the structure; for example, in the case of an application to the production of composite thermal protections, the resistance to ablation may be improved by a "sleek-hair" orientation of the fibers with respect to the gas flow. And furthermore, in every layer, the fibers extend from the inside to the outside of the tubular structure, such that, even if the inside part is attacked by a strong high temperature gas flow, the cold outside part of the fibers remains firmly embedded and the orientation of said fibers helps the discharge of the pyrolysis gases resulting from the degradation of the inside part, without delamination of the structure.

The wrinkles may be disposed slantwise with respect to the axis of the structure. The wrinkles may also vary along the axis of the structure in order to provide a structure having a variable thickness. After formation of the wrinkles, the structure may be reinforced by needling.

Preferably the process comprises the steps consisting in:

bringing the tubular braid over a mandrel of which the inner diameter corresponds to that of the structure to be produced, by causing the braid to pass around a forming head which is mounted on the mandrel and of which the outer diameter corresponds to that of the structure to be produced, and in winding at least one yarn following a helicoidal path on the braid, around the mandrel and at the front of the forming head, between said head and a counter-piece of which the faces in facing relationship have shapes corresponding to the shape of the wrinkles to be produced, said winding of the Yarn being performed while the forming head is moved away from the counter-piece progressively with the formation of the wrinkles.

The winding of the yarn is performed by driving the braid in rotation about the axis of the mandrel while the yarn is advantageously guided through a passage provided in the forming head, which latter is held in a fixed angular position with respect to the axis of the mandrel. A constant restoring force may be permanently exerted to bring the forming head and the counter-piece closer together in such a way as to clamp around the already formed wrinkles.

According to another aspect of the present invention, a device for carrying out the above-defined process is provided, which device comprises:

a rotary mandrel of which the diameter corresponds to that of the structure to be produced, a forming head mounted on the mandrel, and of which the outer diameter corresponds to that of the structure to be produced, a counter-piece mounted on the mandrel, in facing relationship to the forming head, the opposite faces of the forming head and of the counter-piece being shaped correspondingly to the wrinkles to be formed, and one at least of the forming head and of the counter-piece being movable according to a translatory movement in parallel to the axis of the mandrel, means for bringing the braid on the mandrel and over the forming head and for locking the braid in rotation with the mandrel, and means for supplying at least one yarn with a view to winding same according to a helicoidal path on the braid, around the mandrel and between the forming head and the counter-piece, so as to form wrinkles by deforming the braid with the yarn in front of the forming head whereas the counter-piece and forming head are progressively moved away from each other in parallel to the axis of the mandrel.

The forming head is preferably locked in rotation around the axis of the mandrel and is provided with a passage for guiding the yarn being wound on the braid.

Moving the forming head and counter-piece apart is achieved by moving the forming head axially on the mandrel, whereas the counter-piece may be produced in the form of a clamping piece for blocking one end of the braid on the mandrel at the start of production.

BRIEF DESCRIPTION OF THE DRAWINGS

The invention will be more readily understood on reading the following description with reference to the accompanying drawings in which.

DETAILED DESCRIPTION OF PREFERRED EMBODIMENT

Figure 1:
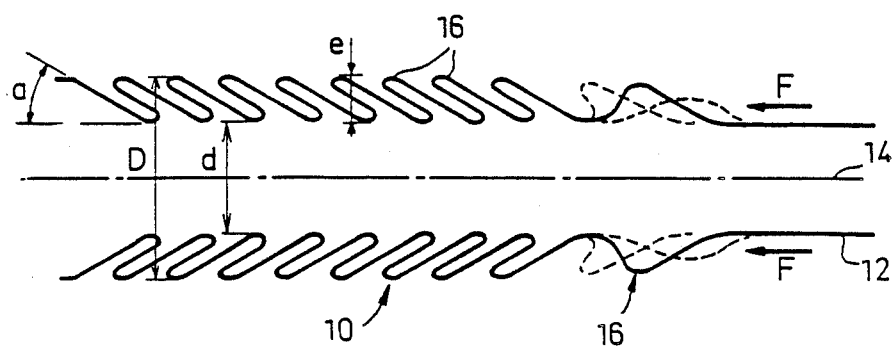
FIG. 1 is a diagrammatical view in cross-section of a laminated tubular structure formed by folding over the wall of a tubular braid, according to the invention.

Referring now to FIG. 1, this shows the formation of a laminated tubular structure by means of a process according to the invention. The structure 10 is produced by folding over a tubular braid 12 along its axis 14 (arrows F) in order to form corrugations or wrinkles 18. The wrinkles 16 are applied against one another and form layers which are superposed in axial direction.

In the illustrated example, the wrinkles are arranged slantwise, meaning that they form an angle a with the axis 14, said angle a being variable between a few degrees and 90°. The amplitude of the wrinkle determines with angle a, the thickness e of the structure 10, namely the difference between its outer diameter D and inner diameter d. Outer diameter D and inner diameter d should be kept within the limits of deformability of the diameter of the tubular braid 12.

The process according to the invention is applicable to the preparation of tubular structures of which the cross-section is not necessarily circular, and of which the center of gravity of the cross-section is not necessarily on a straight line. Thickness e can also be made to vary along the axis of structure 10, by modifying the amplitude and/or the inclination of the wrinkles 16.

An embodiment of the process and device according to the invention will now be described with reference to FIGS. 2 and 3.

Figure 2:
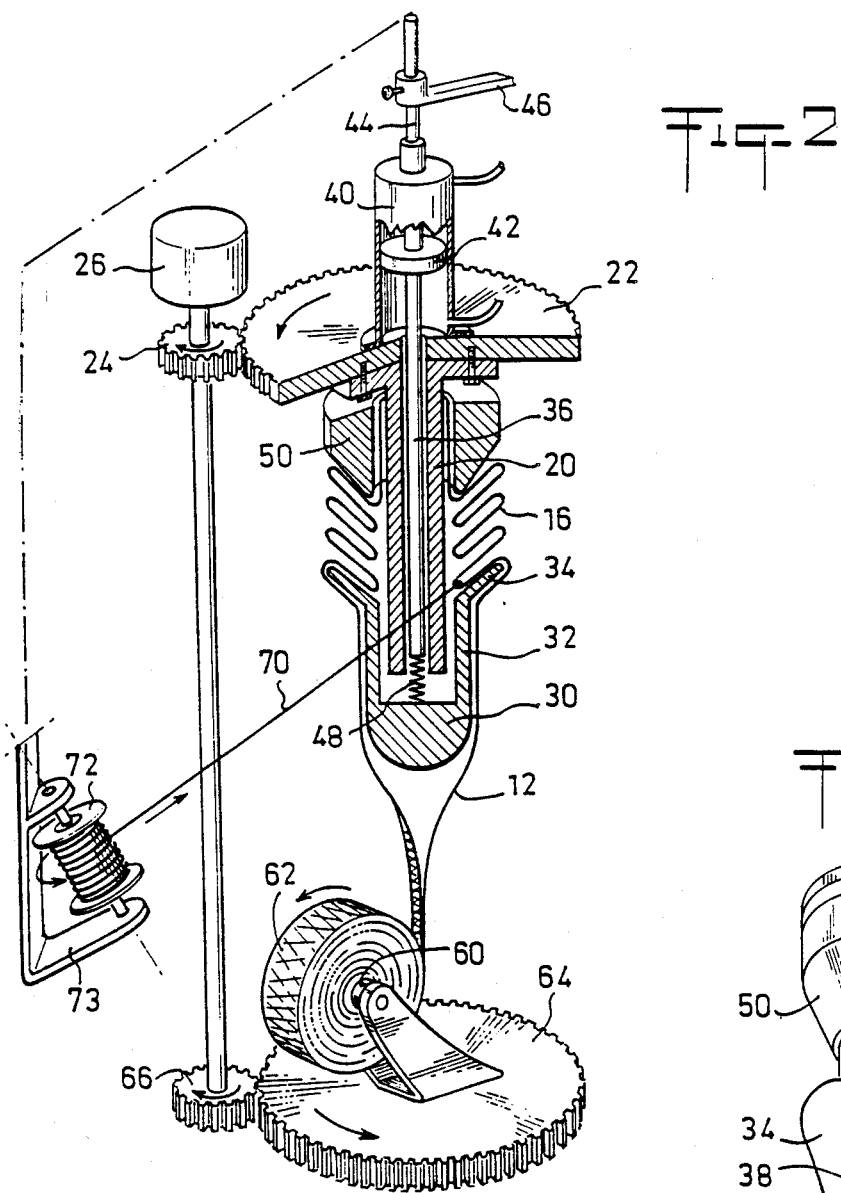
FIG. 2 is a general diagrammatical view of a device according to the invention.
Figure 3:
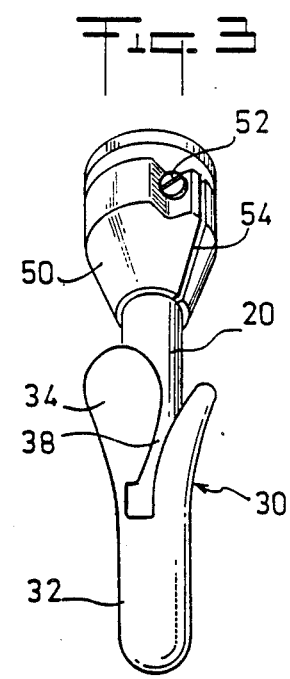
FIG. 3 is a partial perspective view showing in more details the mandrel, the forming head and the counter-piece forming part of the device shown in FIG. 2, FIGS. 4 and 5 are very diagrammatical views illustrating the successive steps for positioning a tubular braid on the device shown in FIG. 2 and for forming and superposing wrinkles on the wall of the braid.

The device illustrated in FIGS. 2 and 3 comprises a rotary mandrel 20 formed by a tube of which the outer diameter is equal to the inner diameter d of the tubular structure to be produced. At one end, the mandrel 20 is fixed to a toothed wheel 22 intermeshing with a pinion 24 coupled to the output shaft of a motor 26.

A shaping piece 30 is mounted at the second end of the mandrel 20. Said piece 30 comprises a tubular body 32 fitted over the end part of the mandrel 20. On the first end side of the mandrel, the body 32 ends into a part of larger diameter 34 constituting the forming head. In the illustrated example, the front face of head 34 which is turned toward the first end of the mandrel is truncated cone-shaped with a maximum diameter corresponding to the outer diameter D of the tubular structure to be produced, and a half-angle at the top corresponding to the required inclination a of the wrinkles of the braid with respect to the axis of the tubular structure.

Piece 30 is not locked in rotation with the mandrel and can be moved with respect to the latter according to a translatory movement in axial direction. To this effect, body 32 is fixed to one end of a pin 36 traversing the mandrel 20 lengthwise of the central axial passage thereof. At its other end, pin 36 is fixed to the piston 42 of a double-acting jack 40. On the side opposite to pin 36, piston 42 is extended by a rod 44 which projects out of the jack body to be fixed to a support 48 preventing all rotation of part 30 about the axis of the mandrel 20.

Said piece 30 cooperates with a clamping piece or counter-piece 50 mounted on the mandrel 20 at the first end thereof. The front face of counter-piece 50 which is in facing relationship to the second end of the mandrel has a truncated cone shape similar to that of the front face of the head 34. This, as explained in more details hereinafter, gives the required shape to the wrinkles of the braid by forming and clamping said wrinkles in the gap between head 34 and counter-piece 50.

Advantageously, said counter-piece 50 is produced as a truncated cylindrical ring, split in such a way as to constitute also a clamp for clamping the end of the braid in position on the mandrel 20. Tightening is achieved simply by way of a screw 52 traversing the spilt part 54 of counter-piece 50. It is however understood that any other appropriate means can be used for gripping the braid.

The tubular braid is brought on the mandrel 20, over the shaping piece 30. To this effect, the braid is unwound from a reel 60 on which it is rolled up 62 in flattened condition for storage. The reel 60 is fast with a toothed wheel 64 intermeshing with a pinion 66 mounted on the driving shaft of the motor 28 in order to be driven in rotation with the same angular speed as the mandrel 20.

In the illustrated example, the mandrel 20, the shaping head 30 and the wheel 64 supporting the reel 60 are in alignment along a vertical axis. The assembly however could also be placed horizontally.

As described in more details hereinafter, the bottoms of the wrinkles formed between the head 34 and the counter-piece 50 are defined by winding a yarn 70 over the braid around the mandrel 20. The yarn 70 is pulled from a storage bobbin 72 and, as described hereinafter, has one end fixed to the first end of the mandrel, while, for example, passing through the radial slot 54 of the counter-piece 50. Winding of the yarn is performed by the rotation of the mandrel.

The yarn 70 is guided by a guiding slot 38 which extends from the outermost front edge of the head 34 to which it is progressively joined, to the tubular body 32, close to the connection of said body with head 34. When the mandrel 20 is driven in rotation, the yarn 70 is unwound. Said yarn, being tensioned, causes the braid to deform by directing it to pass into the slot 38 down to the diameter of the mandrel 20 over which it is tightly pulled.

The wrinkles of the braid are stacked one over the other between the head 34 and the counter-piece 50. Thus, as the formation of the structure progresses, the distance between the counter-piece 30 and the head 34 increases gradually.

The jack 40 must therefore be allowed a long enough stroke in axial direction as a function of the length of the structure to be produced. Elastic means, constituted by a draw spring 48, are provided between the pin 36 and the forming head 34 for the purpose of urging said head permanently in the direction of counter-piece 50.

The restoring force tending to bring the forming head 34 and the counter-piece 50 closer together is preferably constant and regulated by controlling the jack 40 as a function of the level of spring 48. It is indeed possible, when the restoring force compressing the spring 48 has been regulated, to determine the spring adjusting variation and to control the jack. A detection device is provided to this effect which device works in response to a variation in the length of the spring, from the condition of that spring corresponding to the initially adjusted compression force, for controlling the fluid admission into the jack on either side of the piston. Said detection device may consist for example in a sensor, not shown in the drawings, which is fixed on the end of a rod traversing pin 36 and spring 48 and abuts on piece 30, and which actuates, via the pin carrying it, a distribution valve feeding fluid to the jack 40.

Preferably, the angular position of the yarn 70 with respect to the forming head 34 should remain constant. A support 73 for bobbin 72, fixed on the end of the spindle 44 enables the simultaneous axial displacement of the bobbin 72 and of the forming head 34.

Figure 4:
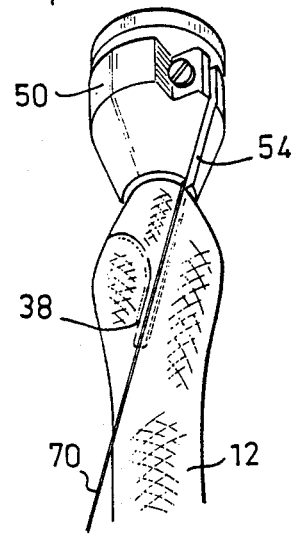
Figure 5:
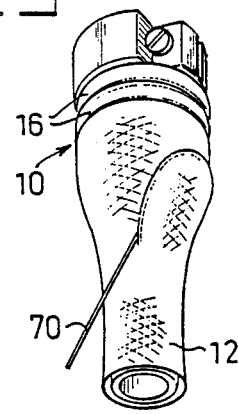

FIGS. 4 and 5 illustrates successive steps of wrinkles forming and stacking on the braid 12.

To start with, as illustrated in FIG. 4, the free end of the braid 12 is brought up to the first end of the mandrel 20 while being passed around the shaping part 30, which is in set back position and is interlocked with the mandrel by the tightening of counter-piece 50. The outer diameter of the mandrel as well as the inner diameter of the braid 12 in non-deformed state are so selected as to be substantially equal to the inner diameter of the structure to be produced.

The yarn 70, having been threaded in the slot 38, down to the bottom thereof, is then brought over the braid 12, and into the slot 54. The free end of yarn 70 is fixed to the first end of the mandrel 20, for example by winding the yarn 70 several times around the mandrel.

The jack 40 is then controlled to bring the head 34 in a forward position near the counter-piece 50. As the yarn 70 holds the braid tightly on the mandrel between the head 34 and the counter-piece 50, the movement of the head 34 causes the formation of a first wrinkle 16 on the braid.

Other wrinkles 16 are then formed successively by driving mandrel 20 and braid 12 in simultaneous rotation with a backward movement of the forming head. The yarn 70 is thus wound along a helicoidal path on the braid 12, around the mandrel. The deformation of the braid 12 driven in rotation by the yarn 70 guided inside slot 38 whose angular position is fixed, causes the formation of wrinkles while drawing the necessary length of braid. The backward movement of the head 34 is controlled by jack 40, spring 48 permitting to hold the wrinkles 16 in a clamped position between the forming head 34 and the counter-piece 50. A laminated tubular structure is thus produced with the wrinkles 16 superposed in axial direction and inclined with respect to the axis at an angle defined by the inclinations of the front faces of both the head 34 and the counter-piece 50, as can be seen in FIG. 5.

The wrinkles 16 in the structure 10 produced as described hereinabove are cone-shaped and follow the helicoidal path of the yarn 70, one wrinkle being formed with every turn of the yarn.

Other helicoidal wrinkles may be obtained particularly by forming several wrinkles with every turn of the yarn.

Figure 6:
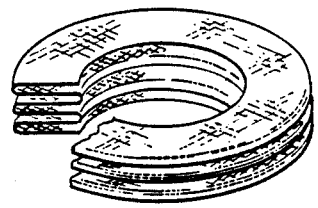
FIGS. 6 and 7 illustrate very diagrammatically a variant of the process according to the invention for producing another type of wrinkles on the wall of the braid.
Figure 7:
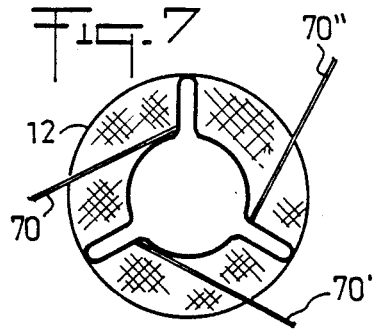

FIG. 6, for example, shows a section of structure with three wrinkles per turn. Such a structure is produced with a device which differs from that shown in FIGS. 2 and 3 in that three winding yarns 70, 70', 70" are fed simultaneously, as diagrammatically illustrated in FIG. 7. The yarns 70, 70', 70" are brought into contact with the structure in angularly equidistant zones. To this effect, the shaping head, not shown, is provided with three guiding slots situated at regular intervals around the head. This example is in no way restrictive.

Although in the foregoing, only the formation of cone-shaped wrinkles has been considered, other forms can be produced such as, for example spherical shaped wrinkles, by giving the corresponding spherical shape to the front faces of the forming head and of the counter-piece.

The material constituting the tubular braid 12 is selected as a function of the intended use of the structure. In the case of a reinforcement for a composite piece destined to withstand high thermal stresses, the selected braid will be produced from refractory fibers or precursors thereof, such as for example a braid in pre-oxidized PAN (polyacrylonitrile) fibers, which is a carbon precursor. The braid is produced with the selected fibers by any of the conventional textile processes for producing a tubular braid.

The winding yarn 70 can be in the same material as that constituting the braid and can than remain permanently within the structure. It is also possible to use a yarn in a material which will be eliminated during the subsequent treatment of the structure, such as for example a material which is destroyed by the heat when the structure is heated to the temperature required for the densification phase, namely for forming the matrix which will fill the pores of the structure.

Before being densified, the structure may be reinforced, for example by undergoing a needling operation, in a direction non-parallel to the wrinkles, or by undergoing an implantation of yarns according, for example, to the technique described in U.S. Pat. No. 4,628,846.

Then, in order to obtain the desired composite piece, the structure is densified by core-depositing a matrix-forming material, such as a thermosetting resin, carbon or another refractory material such as a ceramics material.

Various densifying methods may be used, such as the chemical vapor infiltration method, or the liquid impregnation followed by a heat treatment or else an infiltration preceded by a pre-impregnation. The material constituting the matrix, like the material constituting the reinforcing structure, is selected as a function of the desired application. It may be resin, pyrolitic carbon or another refractory material such as silicon carbide deposited by chemical vapor deposition according to a technique which is now well under control.

The structure obtained according to the invention is well adapted to the production of thermal protections, particularly for the rear extensions of solid propellant rocket motors, since the resistance to ablation caused by the flow of high temperature gases can be substantially increased by a "sleek-hair" orientation of the wrinkles. Moreover, and as already indicated, the continuity of the fibers between the inner diameter and the outer diameter of the structure improves the resistance in cases of degradations of thermal origin on the inside of the structure.

What is claimed is:

1. A process for the production of a laminated tubular fibrous structure comprising layers of fibrous material which are superposed in an axial direction, each one extending from an inside surface to an outside surface of the structure, said process comprising the steps of:

providing a tubular braid made of fibrous material and progressively folding over the wall of the tubular braid to form corrugations or wrinkles therein; and superposing said corrugations or wrinkles successively upon one another, which corrugations and wrinkles constitute said layers of fibrous material, wherein said progressive folding of the tubular braid and said successive superposing of the corrugations or wrinkles formed thereby take place simultaneously.

2. Process as claimed in claim 1, wherein the wrinkles are disposed slantwise with respect to the axis of the structure.

3. Process as claimed in claim 1, wherein the wrinkles vary along the axis of the structure in order to give a variable thickness to said structure.

4. Process as claimed in claim 1, wherein said structure is reinforced by needling.

5. A process for the production of a laminated tubular fibrous structure comprising layers of fibrous material which are superposed in axial direction, each one extending from the inside surface to the outside surface of the structure, said process including the steps of providing a tubular braid made of fibrous material and progressively folding over the wall of the tubular braid to form corrugations or wrinkles and to progressively bring said corrugations or wrinkles into superposition upon one another, which corrugations and wrinkles constitute said layers of fibrous material, by the steps of:

bringing the tubular braid over a mandrel of which the inner diameter corresponds to the inner diameter of the structure to be produced, by causing the braid to pass around a forming head which is mounted on the mandrel and of which the outer diameter corresponds to the outer diameter of the structure to be produced, and in winding at least one yarn following a helicoidal path on the braid, around the mandrel and at the front of the forming head, between said head and a counter-piece of which the faces in facing relationship have shapes corresponding to the shape of the wrinkles to be produced, said winding of the yarn being performed while the forming head is moved away from the counter-piece progressively with the formation of the wrinkles.

6. Process as claimed in claim 5, wherein a constant restoring force is permanently exerted in order to bring the forming head and the counter-piece closer together.

7. Process as claimed in claim 6, wherein the restoring force is exerted by means of a jack, via a spring, said jack being controlled by the level of the spring in order to keep said restoring force constant.

8. Process as claimed in claim 5, wherein the yarn is wound by driving the braid in rotation about the axis of the mandrel.

9. Process as claimed in claim 8, wherein the forming head is kept in a fixed angular position with respect to the axis of the mandrel, and the yarn is guided in a passage formed in the forming head in order to cause the formation of the wrinkles by deformation of the braid by means of the yarn which is wound on the mandrel while being guided by said forming head.

10. Process as claimed in claim 5, wherein several yarns are simultaneously wound on the braid, around the mandrel.

* * * * *